United States Patent [19]

Scherl

[11] Patent Number: 4,513,442
[45] Date of Patent: Apr. 23, 1985

[54] METHOD FOR LOCATING AND CIRCUMSCRIBING TEXT AREAS ON A MASTER WHICH MAY CONTAIN TEXT, GRAPHICS AND/OR IMAGE AREAS

[75] Inventor: Wolfgang Scherl, Munich, Fed. Rep. of Germany

[73] Assignee: Siemens Aktiengesellschaft, Berlin & Munich, Fed. Rep. of Germany

[21] Appl. No.: 348,279

[22] Filed: Feb. 12, 1982

[30] Foreign Application Priority Data

Feb. 27, 1981 [DE] Fed. Rep. of Germany ....... 3107655

[51] Int. Cl.$^3$ .......................... G06K 9/60; G06K 9/34
[52] U.S. Cl. ......................................... 382/49; 382/9; 382/48
[58] Field of Search .......................... 382/9, 48, 49, 22

[56] References Cited

U.S. PATENT DOCUMENTS

| 3,496,543 | 2/1970 | Greenly | 382/9 |
| 3,805,237 | 4/1974 | Cobb et al. | 382/9 |
| 4,411,015 | 10/1983 | Scherl et al. | 382/51 |

Primary Examiner—John C. Martin
Assistant Examiner—Michael D. Parker
Attorney, Agent, or Firm—Hill, Van Santen, Steadman & Simpson

[57] ABSTRACT

A method for locating and circumscribing text areas on a master which may contain text, graphics and/or image areas employs the steps of optoelectronically scanning the master, digitizing the analog signals obtained from the scanning, processing the digital values for forming a plurality of isolated black blocks, and statistically analyzing the coordinates corresponding to the beginning and the end of the black blocks in order to obtain a statistical decision as to whether a particular black block being analyzed represents a line of text.

10 Claims, 14 Drawing Figures 620 and V-70 Series rd 2100 Series computers
Nova and Eclipse
uters
nd 80 Series computers
inter plotters can be
ariety of computer
communication line.
s asynchronous and
RS-232C standard. This
s transmission rates of
0 baud. The data in
be compressed to
ount of time necessary Powerful GPR software
Varian Graphics new GPR softw
package greatly simplities the
programmer's task of constructi
programs to fit specific applicatio
Consisting of Fortran and assem
language subroutines this softw
provides the user flexibility in pro
virtually any graphic presentation

LW
LB

LO

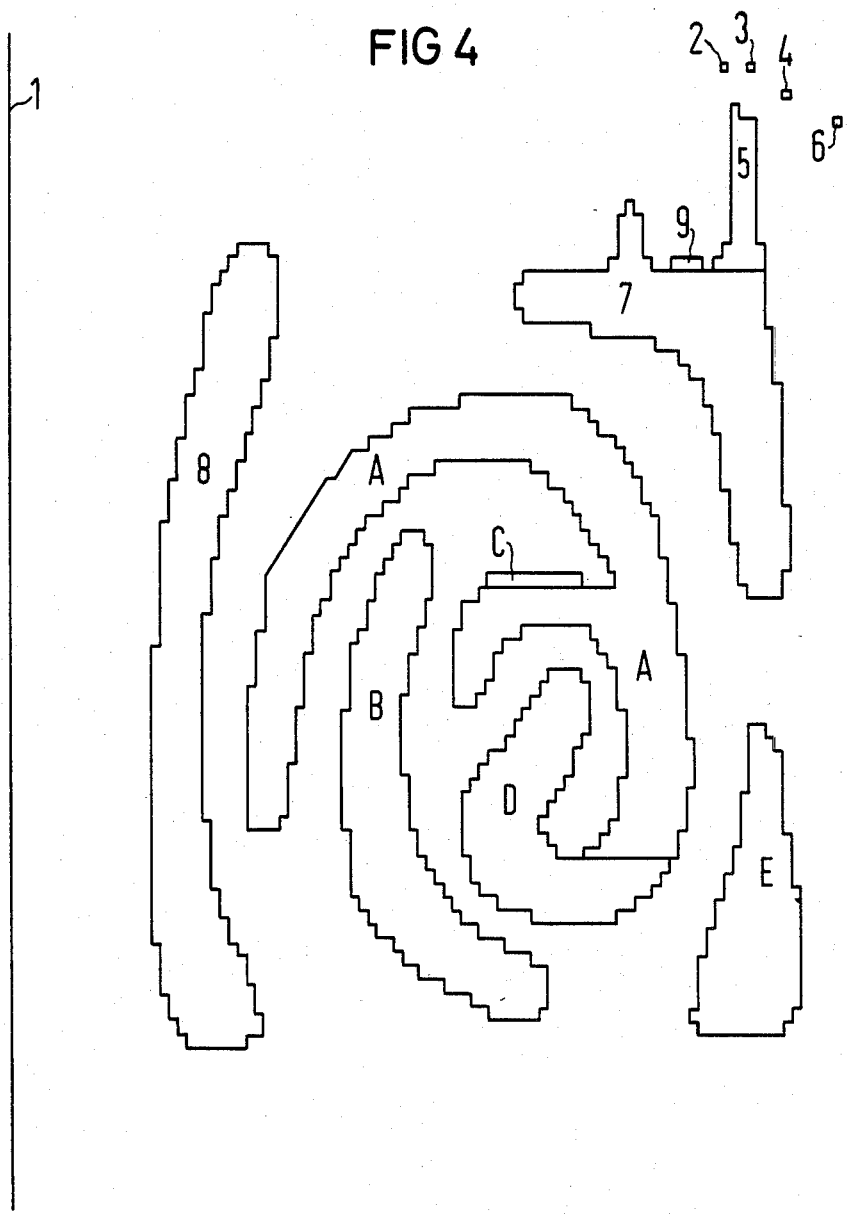

FIG 5

620 and V-70 Series rd 2100 Series computers
Nova and Eclipse
uters
nd 80 Series computers
inter plotters can be
ariety of computer
communication line.
s asynchronous and
RS-232C standard. This
s transmission rates of
0 baud. The data in
be compressed to
ount of time necessary

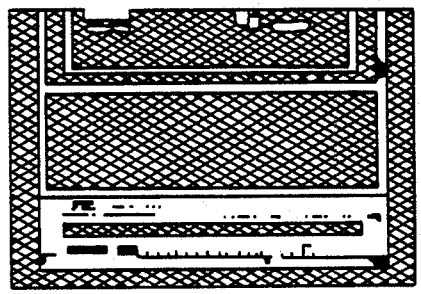

Powerful GPR software
Varian Graphics new GPR softw
package greatly simplifies the
programmer's task of constructi
programs to fit specific applicatio
Consisting of Fortran and assem
language subroutines this softw
provides the user flexibility in pro
virtually any graphic presentation

FIG 6

DMA
inside the standu
n the computer
ac 620 and V-70 Series
ckard 2100 Series
s
11 computers
eral Nova and Eclipse
computers
70 and 80 Series computers
000 printer/plotters can be
s to a variety of computer
over a communication line.
erface is asynchronous and
s to the RS-232C standard. This
e supports transmission rates of
d to 9600 baud. The data in
be compressed to
necessary

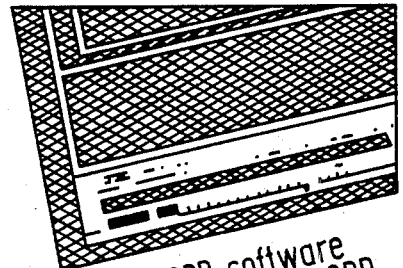

Powerful GPR software
Varian Graphics new GPR
package greatly simplities
programmer's task of con
programs to fit specific a
Consisting of Fortran an
language subroutines, th
provides the user flexib
virtually any graphic pr
The program inter
nd allows the C
in FIG 7
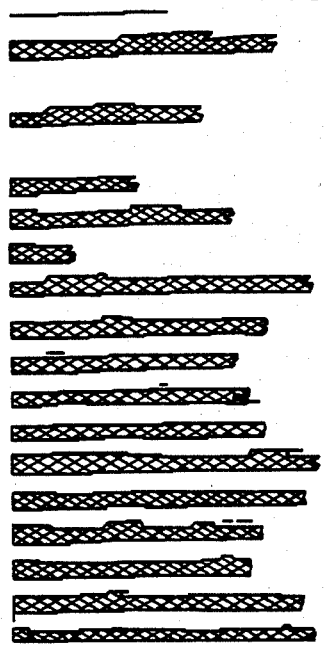
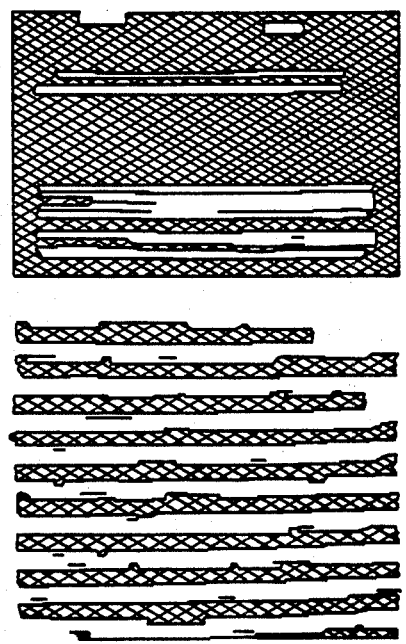
FIG 8
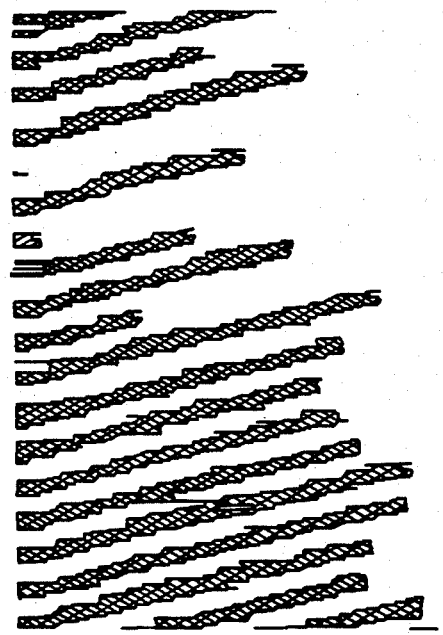
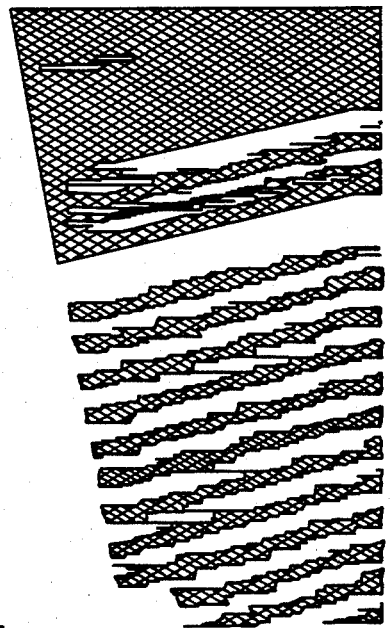

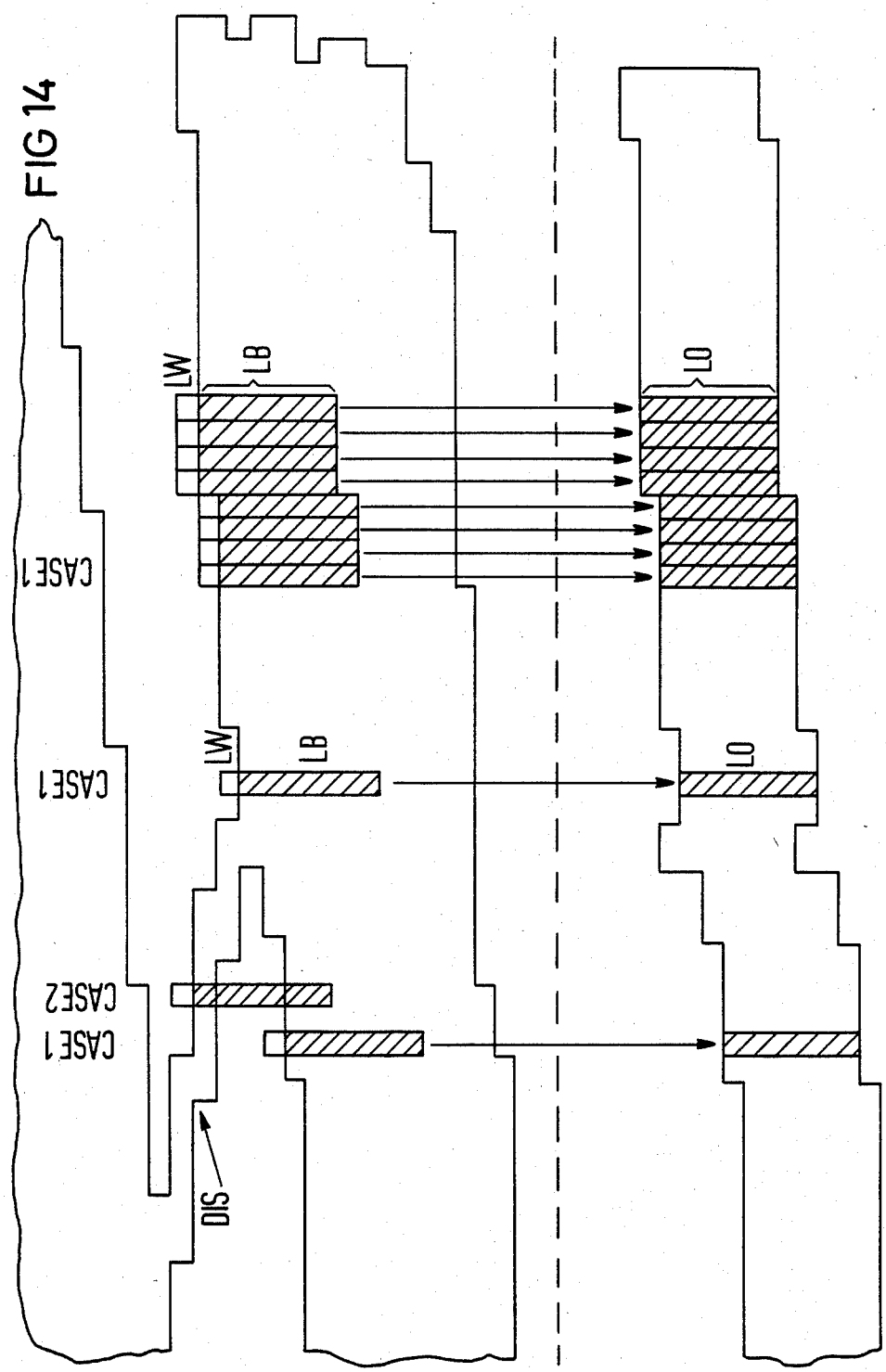

METHOD FOR LOCATING AND CIRCUMSCRIBING TEXT AREAS ON A MASTER WHICH MAY CONTAIN TEXT, GRAPHICS AND/OR IMAGE AREAS

BACKGROUND OF THE INVENTION

The present invention relates to methods for locating and circumscribing text areas on a master which may contain text, graphics and/or image areas, and in particular to such methods which can be employed in automatic word processing units.

Automatic word processing units are increasingly being employed in office use for producing, modifying and storing written documents in an economic and time-saving manner. Such units have the capability of undertaking error corrections, insertion of new text passages, combining two or more texts having different origins, and random reproduction and electronic storage of the data corresponding to the text passages. The advantages of such automatic word processing units in comparison to conventional typewriters are the flexibility and time-saving in the production of written documents which can be generated by such units, and the higher efficiency resulting therefrom. A particularly time consuming step associated with the use of automatic word processing units is the transfer of information already existing on paper into the automatic word processing unit for storage and/or further processing. Manual transfer by keyboard of large amounts of text is extremely time consuming and accordingly various methods and devices have been developed for automatically transferring the information contained in texts into the word processing unit.

A problem in the automatic transfer of existing information contained in text passages into a word processing unit is that the master on which such text passages occur may also contain graphics and/or image areas. It is a problem in the art to automatically identify, classify and store these different types of information areas on a master in order to achieve an optimum coding of the data representing these different master areas as well as to permit separate manipulation of the data representing those areas within the word processor.

SUMMARY OF THE INVENTION

It is an object of the present invention to provide a method for automatically identifying, classifying and storing text areas on a master which may contain text, graphics and/or image areas in a simple, rapid and reliable manner without manual intervention.

The above object is inventively achieved in a method wherein the master is optoelectronically scanned for generating analog signals corresponding to the data on the master. The analog signals are digitized by a decision operation whereby portions of the master representing a "white level" are assigned a first binary number and areas of the master representing a "black level" are assigned a second binary number. All of the areas which are determined in the decision operation to be "black" are multiplied linewise by a predetermined multiplier, so that a horizontal line of a predetermined length is generated from each scanned point. If a line of text has in fact been scanned, the multiplication generates black blocks having a length corresponding to the length of the text line, increased by the predetermined line extension length for "black" points. Each "white" point is also expanded into a stroke of predetermined length by means of multiplication by a multiplier in the reverse direction, the white stroke being greater than the previous black extension, so that the previously-generated black block is abbreviated by a corresponding length. This eliminates slight discontinuities which may have been present in the black block, which is then extended by the differential length with respect to the original text line length, so that a black block extending over the entire text line length is generated. A check is then undertaken for determining whether the horizontal white/black transitions which are characteristic of text areas exist within a prescribed white column length and a prescribed black column length. Every time such a white/black transition is identified, a vertical black stroke of predetermined length is generated so that a black block isolated from its surroundings arises for each text line. In the next step the left and right extreme coordinates of the black blocks thus generated are analyzed by a surface tracking step and are combined in a list, and the extreme coordinates calculated in this manner are then statistically analyzed in order to determine whether they actually limit a text portion of the master.

BRIEF DESCRIPTION OF THE DRAWINGS

FIG. 4 is an illustration of a pattern corresponding to the pattern shown in FIG. 3 which is intermediately generated in accordance with the invention disclosed herein.

FIG. 5 is a typical section from a printing master having a pure text area and a mixed area.

FIG. 6 shows a typical section of a printing master identical to that shown in FIG. 5 disposed at an angle relative to the alignment of the scanning element employed in the method disclosed herein.

FIG. 7 is an illustration of an oscillogram for an intermediate pattern resulting from expanding and contracting the horizontal black areas of the master shown in FIG. 5 in accordance with the method disclosed herein.

FIG. 8 is a representation of an oscillogram for the slanted printing master shown in FIG. 6.

FIG. 14 is an enlarged diagram of text lines from FIG. 7 or FIG. 8 showing the operation by which the corresponding line in FIG. 9 or FIG. 10 is generated in accordance with the method disclosed herein.

DESCRIPTION OF THE PREFERRED EMBODIMENTS

Figure 1:
FIG. 1 is a schematic representation of the format of an input operator for examining a master for the existence of a text area having a prescribed white length and a prescribed black length for use in the method disclosed herein.

A master which may contain text, graphics and/or image areas of the type shown in proper orientation in FIG. 5 and in slanted orientation in FIG. 6 is, in accordance with the principles of the method disclosed herein, first optoelectronically scanned by conventional means such as, for example, by a video scanner for generating analog signals corresponding to the information contained on the scanned master. The analog signal is subjected to a decision operation wherein the analog signals are compared with a predetermined threshold value and are assigned one of two binary numbers. A "white level" is preferably represented by a binary "1" and a "black level" is preferably designated by a binary "0". In a third step, all of the points identified in the decision operation as "black" and represented by the associated binary number are expanded by a predetermined multiplier so that a horizontal stroke of predetermined length is generated from each such point. Thus, wherever a text line appears in the scanned area of the master, black blocks are generated having respective lengths corresponding to the length of the text line and augmented by the prescribed expansion length for the "black" points.

Subsequently in a fourth step each "white" point is respectively expanded into a stroke of a predetermined length larger than the previous expansion of black points by means of a similar operation in the reverse direction operating on the intermediate line consisting of expanded "black" points, so that the previously-generated black block is abbreviated by a corresponding length. The patterns shown in FIGS. 7 and 8 respectively are generated for the master portions shown in FIGS. 5 and 6. In a fifth step, the black block which has in this manner been freed of slight discontinuities is lengthened by the differential length with respect to the original text line length, so that a black block extending over the entire text line length is generated.

The above steps are for the purpose of overcoming the problem that the text line consists of many individual, isolated characters yet the scanning device, in order to identify the separate characters as a text line, must "see" that the individual isolated letters or characters all belong to a unit, namely to the text line. By expanding all of the black points in the horizontal direction (in the expected direction of the course of the text line), the originally-separated characters merge into a unit, namely a black surface. The length of the expansion (the magnitude of the multiplier) depends upon the size of the processed letters. The multiplication factor must be large enough such that the white spaces between the letters and within the letters disappear. The points of the individual letters expanded in such a manner permit the text lines to be represented as a black bar. As a result of the expansion of the points, however, the length of this black bar has become greater than the length of the corresponding text line. Thus, the effect of the expansion must be reversed without the black bar again decomposing into its components. This is achieved by an expansion of the white points as described above in a direction opposite to the previous expansion of the black points. When the black and white expansions are equal in magnitude, a bar will result which has a length precisely corresponding to the length of the text line. If the expansion of the white points is greater than that of the previous expansion of the black points, however, the resulting bar of text line is again generated but slight discontinuities which are smaller than the difference between the white and black expansions disappear. The influence of over- and under-lengths of letters similarly disappear. By freeing the image of such discontinuities in this manner, the bar representing the text line becomes shorter than the text line itself. Thus, it is necessary to then again expand the black points by the differential amount of the black/white shift.

The object of the preceding steps is to re-shape a continuous text line into a continuous black bar. A numerical description of the course of the text align and of the boundaries thereof can be easily taken from such a bar, which must, however, be isolated from its surroundings. As shown in FIGS. 7 and 8, the course and boundaries of the text lines are highly visible on the basis of the bars which have been generated therefrom. The patterns shown in FIG. 8, however, represent a difficulty.

Depending upon the spacing between the text lines and their orientation with respect to the scanner, and on the length of the above-described expansion operation of the black points, the bars of the text lines may become connected to each other or connected to their surroundings such as, for example, graphics areas of the master.

Figure 2:
FIG. 2 is a schematic representation of the format of an output signal for a vertical black stroke in accordance with the method disclosed herein.

In order to overcome this problem, a check of the patterns shown in FIGS. 7 and 8 is undertaken by means of the operator shown in FIG. 1 to determine the horizontal white/black transitions characteristic for text areas. The operator has a preselected white column length LW and a preselected black column length LB. For each case in which a white/black transition occurs, a vertical black stroke LO, as shown in FIG. 2, of a predetermined length is generated so that a black block isolated from its surroundings arises for each text line thereby generating the overall pattern shown in FIGS. 9 and 10. A mapping between enlarged portions of, for example, FIGS. 8 and 10 is shown in FIG. 14 showing examples of case 1 wherein a vertical black stroke LO is generated and case 2 wherein no such stroke is generated. The task of the operator is to disconnect the connections of the text line to its environment and to insure creation of a black bar corresponding to the text line which is isolated from its surroundings.

The operator shown in FIG. 1 comprises only a single column of the overall horizontal transition. When the operator encounters such a section of transition at a random location in the patterns shown in FIGS. 7 and 8, a vertical stroke of the length LO at this location is generated at the corresponding location in the next intermediate image shown in FIGS. 9 and 10.

Figure 9:
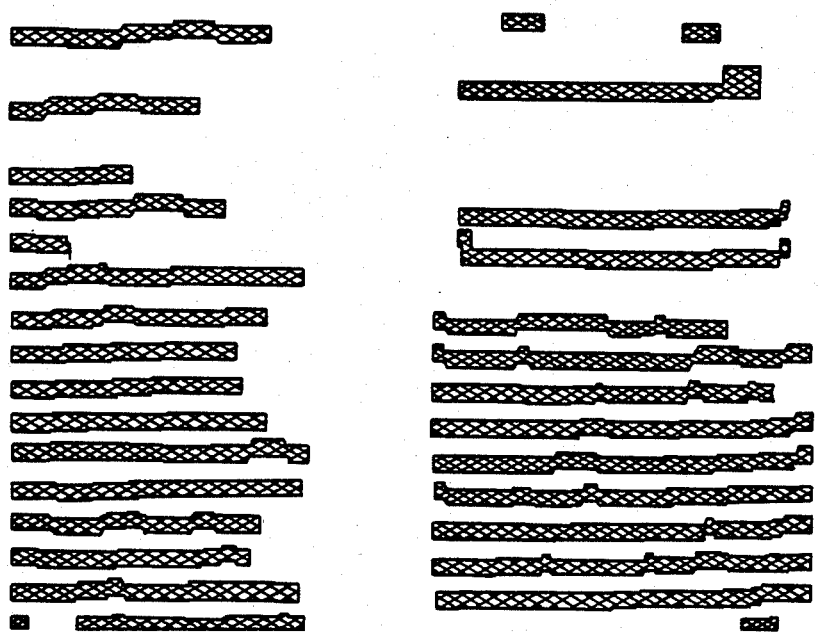
FIG. 9 is an oscillogram for a pattern resulting from the check to determine whether horizontal white/black transitions characteristic for text areas are present in the master shown in FIG. 5.
Figure 10:
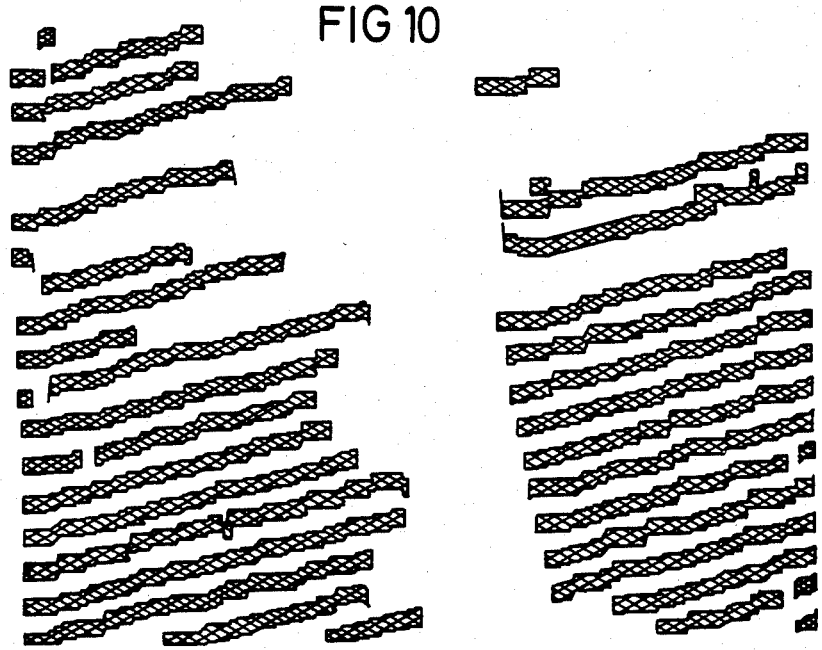
FIG. 10 is an oscillogram for the pattern resulting from the check undertaken to determine whether horizontal white/black transitions characteristic of a text area are present in the slanted master shown in FIG. 6.
Figure 11:
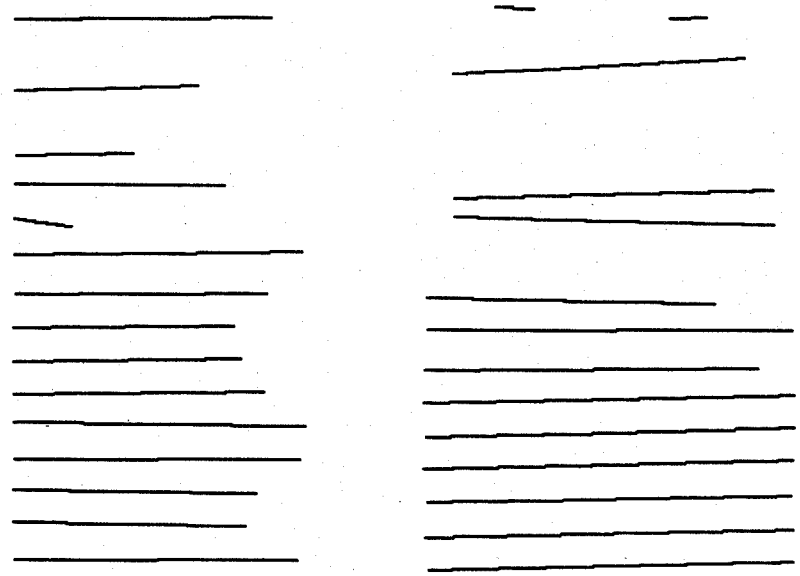
FIG. 11 is a diagram which shows the connected extreme coordinates of the black areas from the master shown in FIG. 5.
Figure 12:
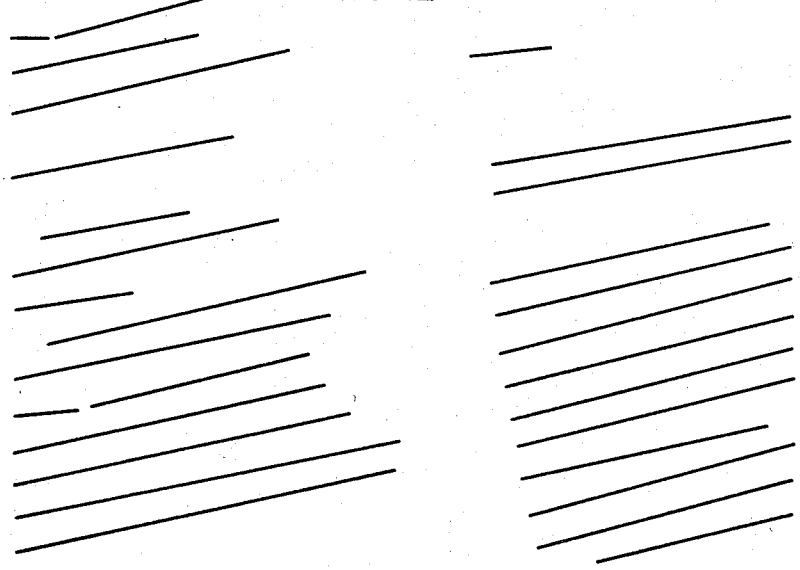
FIG. 12 is a diagram which shows the connected extreme coordinates of the black areas from the master shown in FIG. 6.

The interconnection of all of the vertical strokes LO again produces horizontal bars which correspond to the course of the text lines as shown in FIGS. 9 and 10 which are isolated from one another even if the master is oriented at an angle with respect to the scanner as shown in FIG. 10. The bars isolated in this manner can be easily transformed into a document description by generating a list of the left and right limiting coordinates of each of the respective bars shown in FIGS. 9 and 10. When these boundary coordinates are known, the course of the text line is then also known. As described above, the bar images in FIGS. 9 and 10 are transformed to abstract descriptions of the bars. Each bar in FIGS. 9 and 10 now consists of one entry in a list. The list entry describes the bar only by means of its left and right extreme coordinates. The beginning and end points of the bar, and thus its course, can be seen from these coordinates. Because the bar corresponds to a text line, the beginning point, end point and course of the text line are represented in the list. FIGS. 11 and 12 illustrate the respective list entries for FIGS. 9 and 10 and show their coincidence with the text line in an abstract form. The list entries may subsequently serve as a guide for a reader. The read device can classify the written characters in their proper sequence along the guideline without the possibility of prematurely moving to a different text line. Finally, the extreme coordinates on the list are analyzed by statistical methods so as to determine whether the black bar exhibiting those coordinates is a line of text. The statistical characteristics of text areas, as opposed to graphics and/or image areas of a master, are well known and can be calculated in a number of ways for comparison with the extreme coordinates generated in accordance with the principles of the method disclosed herein. Examples of statistical methods which may be employed are those disclosed in the copending U.S. Pat. No. 411,015 and application of Scherl et al Ser. No 342,898 both assigned to the assignee of the subject matter of the present application.

Figure 13:
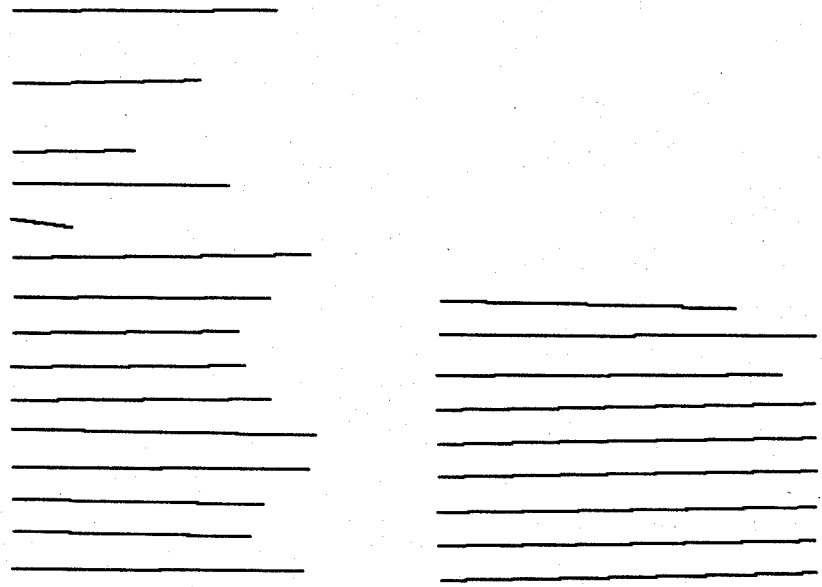
FIG. 13 is a diagram which shows the connected extreme coordinates of the black areas from the master shown in FIG. 5 which have been classified as a text area by statistical analysis.

The result of the statistical check is shown in FIG. 13 which shows the abstract text lines from FIG. 11.

In another embodiment of the invention, the operator is formed by a window of LW+LB scanning lines which is stored in a "rolling" manner such that the first LW scanning lines are inverted and the operator condition can be checked by means of a column-wise sum formation, whereby the operator condition is met when a column sum of 0 is derived.

The existence of a vertical black stroke LO can be checked line-wise by a counter per output column which is reset at the beginning of each new operation. The counter is reduced line-wise by 1 and is set to the length LO when the operator condition is met. As long as the value of the respective column counter is greater than 0, the operator output line is evaluated as belonging to a black block.

The output line generated by the operator is analyzed as to black components. Each newly beginning black area is scanned by a surface tracking method, whereby its extreme coordinates are calculated. Each newly beginning black area is numbered with a number which is increased by 1. Within an uninterrupted black area within a scanning line, such a black area is continuously numbered with the same number. Upon determination of a connection between a black area already numbered in a preceding line and a black area encountered in a newly-scanned line, the numbering of the black area already numbered in the preceding line is retained, so that an already-existing numbering is continued line-wise over the entire black area. Given contact of a black area of the newly-scanned line with several black areas of the earlier line, the respective numbering of the area disposed farthest to the left is retained. A check is undertaken to determine whether the connecting numberings disposed further to the right already exist in the black areas of the line disposed further to the left. When this condition is met, the numbering is employed for the newly-encountered area. A table entry is undertaken for each such numbering, the extreme coordinates occurring by virtue of this numbering being retained therein. Upon transition of a numbering area into a new numbering area, the extreme coordinates are subsequently entered in the table entry for the new numbering. The table entries disappearing by virtue of the overlap are erased from the table after the entry of the new extreme coordinates. Upon termination of a black area and thus upon disappearance of the numbering, the corresponding table entry is transferred into an output list and the black area is seen as being terminated. These entries are further employed as the extreme coordinates of the text line identified above.

Figure 3:
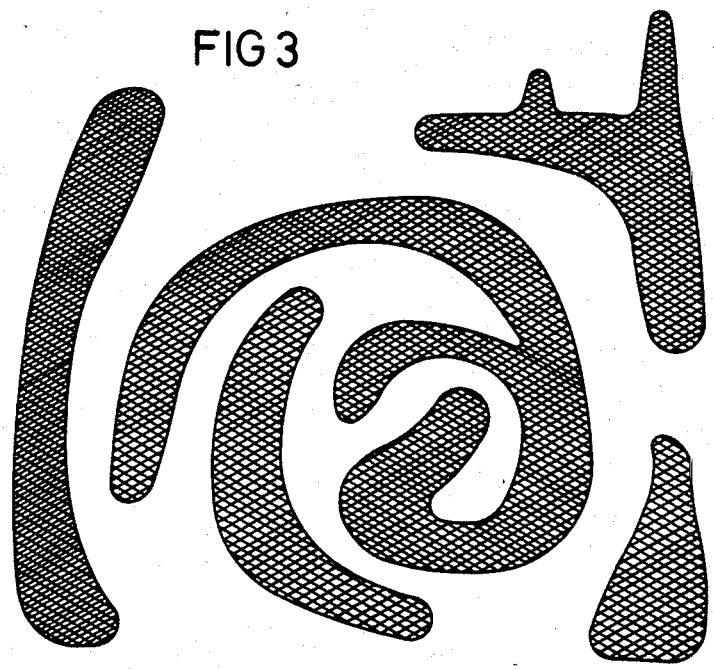
FIG. 3 is an illustration of a randomly selected black/white pattern used to describe the method disclosed herein.

This portion of the method disclosed herein is illustrated by the example of a randomly selected black/white pattern shown in FIGS. 3 and 4. FIG. 3 is a test image for illustrating the surface tracking method with a complicated pattern. The pattern was drawn, placed under a scanner, and read into the image memory in the manner described above. During the read in, however, a scanner fault became noticeable. The front and/or back edge of the electronic video signal becomes visible in the binary electronic image stored in the image memory. The surface referenced at 1 in FIG. 4 is a disruptive black surface with a width of 2 through 5 image points which becomes visible in the electronic image, but is not visible in the original image shown in FIG. 3. This surface is of no significance for the manner of functioning of the method and can be omitted, but is processed by the method just like any other pattern.

As described above, the numbering of the surfaces is undertaken in the computer with continuously incremented numbers. Each image point of a surface is identified with such a number. When more than 9 differently-numbered surfaces exist, however, the numbers needed to identify further surfaces would be multi-place numbers. The use of a multi-place number is not possible for individual image points, however, and the sequence must be re-coded after 9 numbers beginning with letters A, B, C, D, E etc. The re-coding is necessary only for demonstration and is of no significance to the inventive concept. The surface areas identified at 2, 3, 4 and 6 in FIG. 4 show further disruption of the original image due to noise or uncleanliness of the image master which are below the cut-off value of the image threshold used to generate the digital signal. Again, these disruptions are processed as normal black surfaces. The same is true for the surface referenced at 9.

The surface tracking process is undertaken image line by image line in one horizontal pass with no backward steps. As shown in FIG. 4, the surfaces 7, 9 and 5 appear in a single image line. At this point, however, it is not yet known whether these surfaces merge together into a common surface in a subsequent image line farther down on the master. These individual surface portions are processed as separate surfaces until it is known that they do actually merge. When a number of such surface areas merge into one surface, the number of the surface area line farthest to the left is retained for identifying the total surface. In order to uniformly number the surface portions 5, 7 and 9, at least two horizontal passes would be necessary in which it would first be determined that the areas 5, 7 and 9 belong to one surface and the surface would then be uniformly numbered in a second pass. The disadvantage of such a method would be that the entire document would have to be intermediately stored point by point requiring an extremely large image memory. The inventive method therefore employs only a single pass and does not need a complete image memory but only a small section of the scanned master.

In a further embodiment of the invention the signals generated in analog form representing the optoelectronic imaging are divided into "white levels" and "black levels" by an analog method.

If, however, the division into "white levels" and "black levels" is undertaken digitally, a permanently prescribed reference value serving as a threshold value can be employed. It is within the concept of the method disclosed herein, however, that the reference value be adaptable in order to account for non-linearities in the operating mode of the device for the particular optoelectronic scanning which is employed. The threshold level can be set to accommodate such non-linearities as are known. The reference or threshold value may also be continuously varied by feedback means during the course of a scanning operation, rather than being set at a specified value which remains unchanged throughout the entire operation.

Although modifications and changes may be suggested by those skilled in the art it is the intention of the inventor to embody within the patent warranted hereon all changes and modifications as reasonably and properly come within the scope of his contribution to the art.

I claim as my invention:

1. A method for locating and circumscribing text areas on a master which may contain text, graphics and/or image areas comprising the steps of:

optoelectronically scanning said master for generating analog signals corresponding to an optoelectronic imaging of said master;

converting said analog signals into digital signals by undertaking a decision operation by assigning a first binary number to analog signals representing a white level and assigning a second binary number to analog signals representing a black level;

expanding all points having a black level line-wise by a predetermined multiplier such that a horizontal stroke of predetermined length is respectively generated for each point whereby a black block is generated for each line of text on said master, said black block having a length equal to the length of the line of text plus a predetermined extension length for said black points;

expanding all points remaining after the previous step representing a white level by a predetermined multiplier for expanding said white points in a direction opposite to the expansion of said black points, the expansion of said white points being greater than the expansion of said black points;

extending said black block by a differential length with respect to the original length of the line of text such that a black block extending over the entire line of text is generated;

analyzing said black block with an operator for determining whether horizontal white/black transitions characteristic of text areas exist having a predetermined white column length and a predetermined black column length;

generating a vertical black stroke of predetermined length for every white/black transition such that an isolated black block is generated for each line of text;

listing the left and right extreme coordinates of said black block; and statistically analyzing said extreme coordinates for said black blocks for determining whether said coordinates are boundaries for a line of text.

2. The method of claim 1 wherein said operator is a window of scanning lines stored in a rolling manner such that a predetermined number of first scanned lines are inverted and a condition for determining the existence of a white/black transition is determined by a column-wise sum formation of the scanned line such that the condition is present when said column sum is equal to 0.

3. The method of claim 1 wherein a counter is provided per output column for said vertical black strokes and comprising the additional steps of reducing said counter by 1 for each line and erasing said counter at the beginning of a new operation and setting said counter to a predetermined length when the operator condition is satisfied indicating a white/black transition, said operator condition being satisfied whenever the value of a respective column counter is greater than 0.

4. The method of claim 1 comprising the additional step of analyzing each output line of vertical black strokes generated by said operator for the existence of black components by the steps of:

assigning a number to each newly beginning black area which number is incremented by 1 for each such newly beginning black area such that the number for each area is continued within an uninterrupted black area within a scanning line;

upon determination of contact between a black area already numbered in a preceding line and a black area to be newly numbered in a line currently being scanned, assigning the numbering of the already numbered black area in the preceding line to the overall black area extending over the two lines;

upon contact of a black area of a currently scanned line with a plurality of black areas of an earlier scanned line, numbering said black area of said newly scanned line with the number of the area of said earlier line disposed farthest to the left;

checking to determine whether numberings of contacting areas disposed further to the right already exist in black areas of the line disposed further to the left and if such condition is met numbering the area in the newly scanned line with the same number;

entering each said number in a table entry with the extreme coordinates for the area associated with said number;

substituting the extreme coordinates for a black area in a subsequent line which contacts the black area having coordinates already entered in said table;

transferring the extreme coordinates of a black area upon termination of said black area to an output list; and employing said extreme coordinates for said black area as the extreme coordinates for undertaking said statistical analysis.

5. The method of claim 1 wherein said analog signals generated by said optoelectronic scanning are divided into white levels and black levels by analog means.

6. The method of claim 1 wherein said analog signals generated by said optoelectronic imaging are converted into digital values representing white levels and black levels by comparison of said analog signal with a predetermined digital threshold value.

7. The method of claim 6 wherein said threshold value is a constant.

8. The method of claim 7 wherein said threshold value is calculated based on the environment in which the method is employed.

9. The method of claim 8 wherein said threshold value is calculated based on the characteristics of a device employed for said optoelectronic scanning.

10. The method of claim 6 wherein said threshold value is continuously recalculated from said analog signals.

* * * * *